United States Patent
Chen et al.

(10) Patent No.: US 10,088,943 B2
(45) Date of Patent: Oct. 2, 2018

(54) TOUCH CONTROL DEVICE AND OPERATING METHOD THEREOF

(71) Applicant: ASUSTeK COMPUTER INC., Taipei (TW)

(72) Inventors: Ya-Ting Chen, Taipei (TW); Hung-Yi Lin, Taipei (TW); Yi-Ou Wang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 29 days.

(21) Appl. No.: 15/191,538

(22) Filed: Jun. 24, 2016

(65) Prior Publication Data

US 2017/0003805 A1 Jan. 5, 2017

Related U.S. Application Data

(60) Provisional application No. 62/186,381, filed on Jun. 30, 2015.

(30) Foreign Application Priority Data

Jan. 8, 2016 (TW) .............................. 105100479 A

(51) Int. Cl.
*G06F 3/044* (2006.01)
*G06F 3/041* (2006.01)
*G06F 3/0354* (2013.01)
*G06F 3/0488* (2013.01)

(52) U.S. Cl.
CPC ........ *G06F 3/0416* (2013.01); *G06F 3/03547* (2013.01); *G06F 3/044* (2013.01); *G06F 3/04883* (2013.01); *G06F 2203/04104* (2013.01)

(58) Field of Classification Search
CPC ....................................................... G06F 3/044
See application file for complete search history.

(56) References Cited

U.S. PATENT DOCUMENTS

| | | | |
|---|---|---|---|
| 7,834,855 B2 | 11/2010 | Hotelling et al. | |
| 8,654,524 B2* | 2/2014 | Pance ................... | G06F 1/1616 345/177 |
| 2004/0021633 A1* | 2/2004 | Rajkowski ............ | G06F 3/0233 345/156 |
| 2006/0044259 A1* | 3/2006 | Hotelling ............... | G06F 1/1616 345/156 |
| 2011/0018806 A1* | 1/2011 | Yano ..................... | G06F 3/0488 345/163 |
| 2012/0013009 A1 | 1/2012 | Zhu et al. | |

(Continued)

*Primary Examiner* — Olga Merkoulova
(74) *Attorney, Agent, or Firm* — JCIPRNET

(57) ABSTRACT

A touch control device including a touchpad, a first driving circuit and a system circuit is provided. The first driving circuit is coupled to the touchpad for driving the touchpad to detect a sensed value frame of a touch event on the touchpad. The system circuit is coupled to the first driving circuit for analyzing the sensed value frame provided by the first driving circuit to recognize a first finger position, a second finger position and a third finger position, and defining the first finger position as a left key position of a virtual mouse, the second finger position as a right key position of the virtual mouse according to a position relationship among the first finger position, the second finger position and the third finger position. An operating method of a touch control device is also provided.

20 Claims, 8 Drawing Sheets

Detect a sensed value frame of a touch event on the touchpad — S210

Analyze the sensed value frame to recognize a gesture for operating the mouse — S220

(56) References Cited

U.S. PATENT DOCUMENTS

| | | | |
|---|---|---|---|
| 2015/0077352 A1* | 3/2015 | Ma | G06F 3/03547 |
| | | | 345/173 |
| 2015/0277566 A1* | 10/2015 | Musgrave | H04N 5/23241 |
| | | | 345/156 |
| 2016/0364137 A1* | 12/2016 | Ren | G06F 3/0482 |

* cited by examiner

TOUCH CONTROL DEVICE AND OPERATING METHOD THEREOF

CROSS-REFERENCE TO RELATED APPLICATION

This application claims the priority benefit of U.S. provisional application Ser. No. 62/186,381, filed on Jun. 30, 2015 and TW application serial No. 105100479, filed on Jan. 8, 2016. The entirety of the above-mentioned patent applications are hereby incorporated by references herein and made a part of specification.

BACKGROUND OF THE INVENTION

Field of the Invention

The disclosure relates to a touch control device and, more specifically, to a touchpad and an operating method thereof.

Description of the Related Art

A portable computer is usually configured with a multipoint touchpad for detecting gestures to execute corresponding operations. However, some operations can only use mouse to operate the operations. In this status, the operations of the multi-touch touchpad may not easily substitute the operation of the mouse. Thus when user carries the computer out, it is rather inconvenience for further bringing the mouse.

BRIEF SUMMARY OF THE INVENTION

According to a first aspect, a touch control device including a touchpad, a first driving circuit coupled to the touchpad, configured to drive the touchpad to detect a sensed value frame of a touch event on the touchpad; and a system circuit coupled to the first driving circuit, configured to analyze the sensed value frame provided by the first driving circuit to recognize a first finger position, a second finger position and a third finger position, and to define the first finger position as a left key position of a virtual mouse, the second finger position as a right key position of the virtual mouse according to a position relationship among the first finger position, the second finger position and the third finger position.

According to a second aspect, an operating method of a touch control device is provided. The operating method of the touch control device comprising: providing a touchpad; driving the touchpad by a first driving circuit to detect a sensed value frame of a touch event on the touchpad; analyzing the sensed value frame by a system circuit to recognize a first finger position, a second finger position and a third finger position; and defining the first finger position as a left key position of a virtual mouse and the second finger position as a right key position of the virtual mouse by the system circuit according to a position relationship among the first finger position, the second finger position and the third finger position.

In sum, a touch control device and an operating method thereof are provided to recognize the first finger position, the second finger position and the third finger position of a gesture for operating the mouse and track the state of the first finger position, the second finger position and the third finger position. The first finger position of the gesture for operating the mouse corresponds to a left key position of the virtual mouse, while the second finger position of the gesture for operating the mouse corresponds to a right key position of the virtual mouse.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

The term "couple (or connect)" throughout the specification and the claim includes any direct or indirect connecting means. For example, if a first device coupled (or connected) to a second device is disclosed hereinafter, that means the first device is directly coupled to the second device, or the first device is indirectly coupled to the second device via other devices or connecting means. Additionally, the same or similar reference number denotes the same or similar component/element/step throughout the embodiments and the figures. Descriptions for the component/element/step denoted by the same reference number can be cross-referenced.

Figure 1:
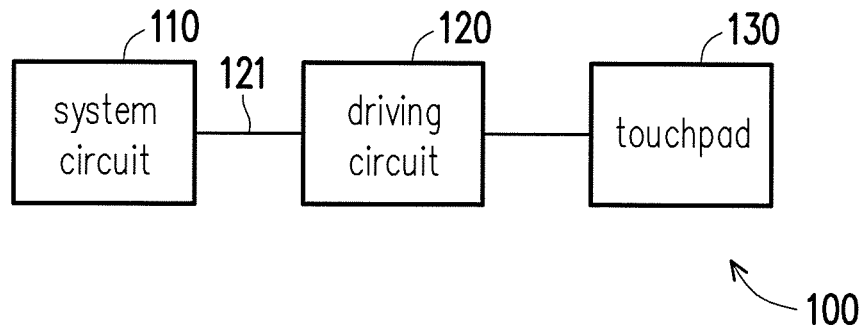
FIG. 1 is a block diagram of a touch control device in an embodiment.

FIG. 1 is a block diagram of a touch control device in an embodiment. In embodiments, a touch control device 100 may be a notebook computer, an electronic computing device of other type or a peripheral device such as a peripheral touchpad.

Referring to FIG. 1, a touch control device 100 includes a system circuit 110, a driving circuit 120 and a touchpad 130. In an embodiment, the touchpad 130 may be a self-capacitance touch panel, a mutual-capacitance touch panel or a touch sensing device of other type. The driving circuit 120 is coupled to the touchpad 130 and the system circuit 110. In an embodiment, the system circuit 110 has a function of recognizing "a gesture for operating a mouse" on the touchpad 130. In an embodiment, the system circuit 110 includes a circuit for running software or firmware, such as a CPU, a microcontroller, a microprocessor and another system circuit.

Figure 2:
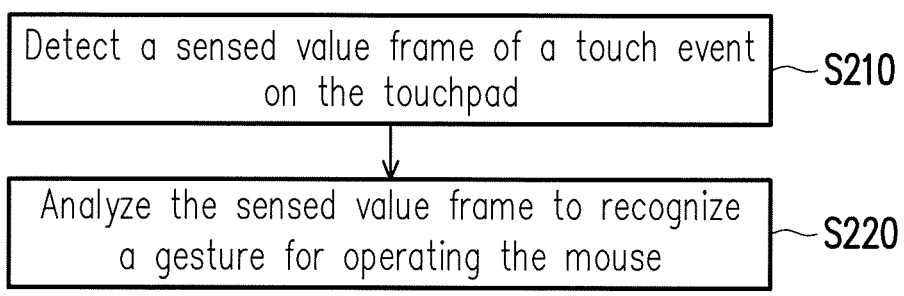
FIG. 2 is a flowchart of an operating method for a touch control device in an embodiment.

FIG. 2 is a flowchart of an operating method for a touch control device in an embodiment. Referring to FIG. 1 and FIG. 2, the touchpad 130 is configured to the touch control device 100. The driving circuit 120 drives the touchpad 130 to detect a sensed value frame of a touch event on the touchpad 130 (step S210). The system circuit 110 analyzes the sensed value frame 121 provided by the driving circuit 120 to recognize the gesture for operating the mouse on the touchpad 130 (step S220). The gesture for operating the mouse includes a first finger position, a second finger position and a third finger position. In an embodiment, the system circuit 110 analyzes the sensed value frame 121 provided by the driving circuit 120 to recognize the first finger position, the second finger position and the third finger position. In an embodiment, the system circuit 110 defines the first finger position as a left key position of the virtual mouse, and defines the second finger position as a right key position of the virtual mouse according to the position relations among the first finger position, the second finger position and the third finger position. According to the gesture for operating the mouse on the touchpad 130, the system circuit 110 triggers a corresponding mouse event, such as a movement event, a right-click, a left-click and a left double-click.

Figure 3:
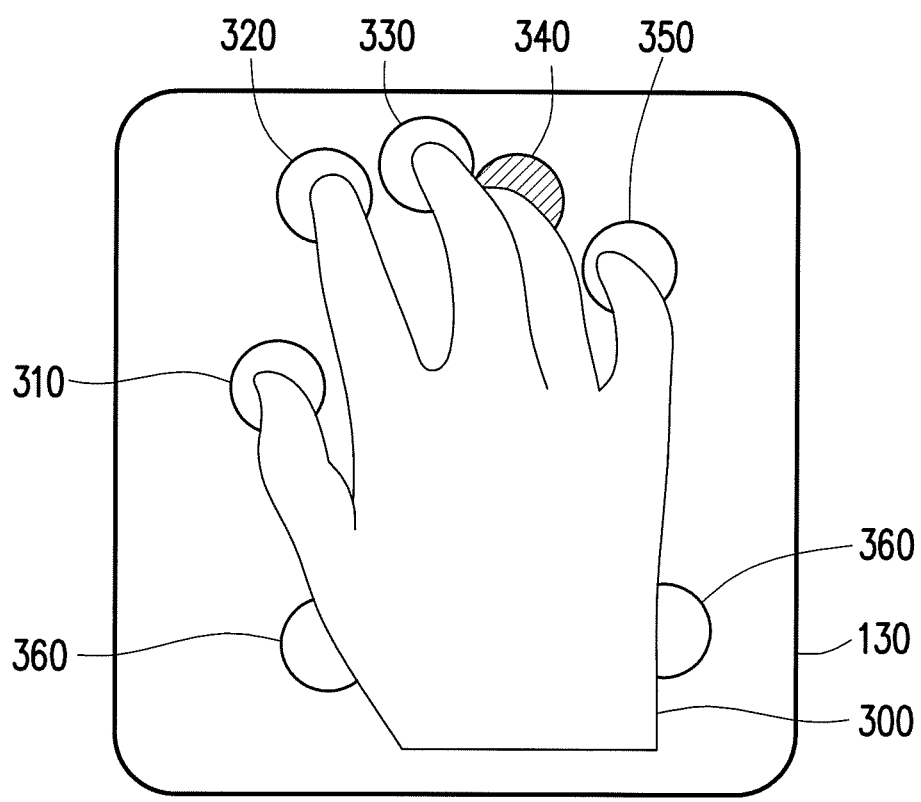
FIG. 3 is a schematic diagram showing a usage scenario of the touchpad in FIG. 1 in an embodiment.

FIG. 3 is a schematic diagram showing a usage scenario of the touchpad in FIG. 1 in an embodiment. The operating gesture is like a gesture when holding a mouse (called as a virtual mouse, which does not actually exist) in a right hand 300 on the touchpad 130. When the user holds a virtual mouse in the right hand 300 to operate on the touchpad 130, the thumb, the forefinger, the middle finger, the ring finger, the little finger and/or part of the palm touch the touchpad 130. The driving circuit 120 drives the touchpad 130 to detect the touch event on the touchpad 130, and outputs a corresponding sensed value frame 121.

Figure 4:
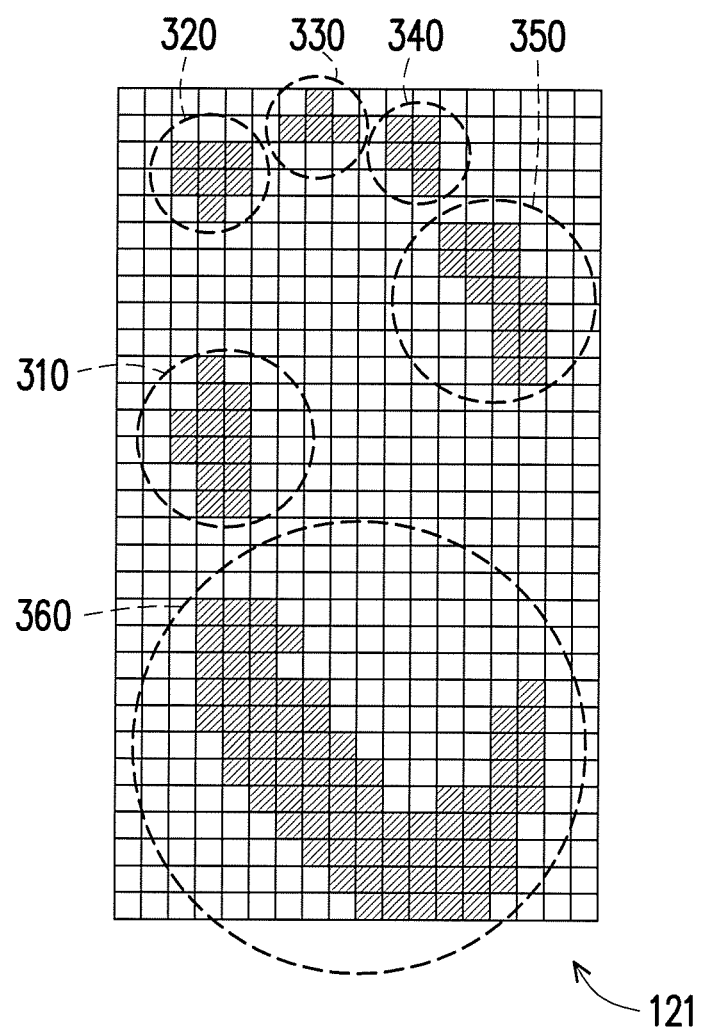
FIG. 4 is a schematic diagram showing a sensed value frame provided by the driving circuit in FIG. 1 in the usage scenario shown in FIG. 3.

FIG. 4 is a schematic diagram showing a sensed value frame provided by the driving circuit 120 in FIG. 1 in the usage scenario shown in FIG. 3. Each little square shown in FIG. 4 represents a sensed value on the touchpad 130 via a sensing unit. The smallest square without shading represents that the sensed value is below a sensing threshold value, which means no touch event occurs in this square. The smallest square with shading represents the sensed value is above the sensing threshold value, which means a touch event occurs in this corresponding square. A mistaken/invalid touch is recognized by comparing the sensed value with the sensing threshold value.

The system circuit 110 analyzes the sensed value frame 121 provided by the driving circuit 120 to recognize the gesture for operating the mouse on the touchpad 130. The gesture for operating the mouse includes the first finger position (such as, the forefinger position 320), the second finger position (such as, the middle finger position 330), and the third finger position (such as, the thumb position 310, the ring finger position 340 and/or the little finger position 350). In an embodiment, the gesture for operating the mouse may further include the palm position 360 according to the user's habits.

Figure 13:
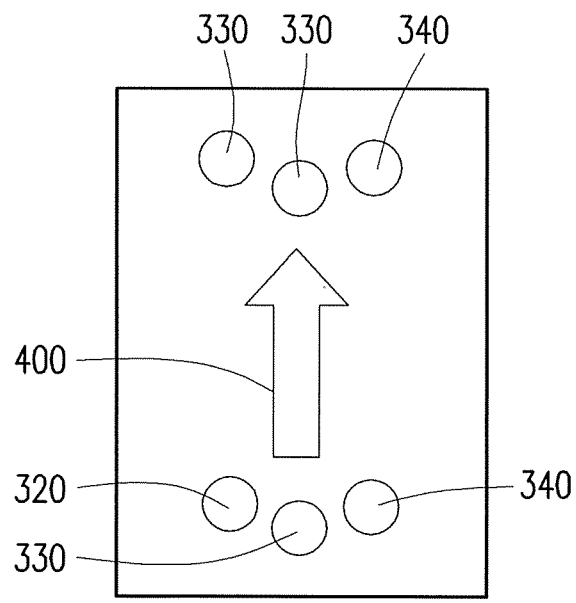
FIG. 13 is a schematic diagram showing a sensed value frame in the usage scenario including the similar vector, according to an embodiment.

The system circuit 110 recognizes the palm position 360 from the sensed value frame. In an embodiment, the system circuit 110 defines the palm position 360 as the position of the virtual mouse. When the system circuit 110 analyzes the sensed value frame and determines that the palm position 360 and all the finger positions (such as 310, 320, 330, 340 and/or 350) detected from the sensed value frame move toward a similar vector 400 in FIG. 13, the system circuit 110 triggers a "cursor movement event" (which is like a movement of the mouse) according to the similar vector 400. That is, when the cumulative displacement of each finger moving from a first position to a second position reaches a preset threshold value, the cursor movement is triggered. In an embodiment, when the cumulative displacements of the five fingers reach (−10,2), (−18,3), (−15,−1), (−10,0), (−7,1), respectively, the cursor moves in a horizontal direction to the left. In an embodiment, only the finger position(s) (such as 310, 320, 330, 340 and/or 350), but not the palm position 360 (for example, the user operates the virtual mouse with the wrist in the air) are detected from the sensed value frame 121. When the palm position 360 is not detected from the sensed value frame 121, the system circuit 110 calculates a barycenter position (called as finger barycenter) of the fingers based on the finger positions 310, 320, 330, 340 and/or 350. The finger barycenter is a geometric center point of a coordinates of five fingers (or four fingers, or three fingers). In an embodiment, it is assumed that only the finger positions 310 and 320 are detected from the sensed value frame 121, the finger barycenter is at the midpoint between the finger position 310 and the finger position 320. In an embodiment, it is assumed that only the finger positions 310, 320 and 330 are detected from the sensed value frame 121, the finger barycenter is the geometric center point of a triangle constituted by the finger positions 310, 320 and 330. In an embodiment, when the palm position 360 is not detected from the sensed value frame 121, the finger barycenter corresponds to the position of the virtual mouse. In an embodiment, when all the detected finger positions (e.g., the thumb position 310, the forefinger position 320, the middle finger position 330, the ring finger position 340 and/or the little finger position 350) move toward the similar vector simultaneously, the finger barycenter also moves toward the similar vector. As a result, the system circuit 110 triggers the "cursor movement event" (which is like the movement of the mouse).

Figure 12:
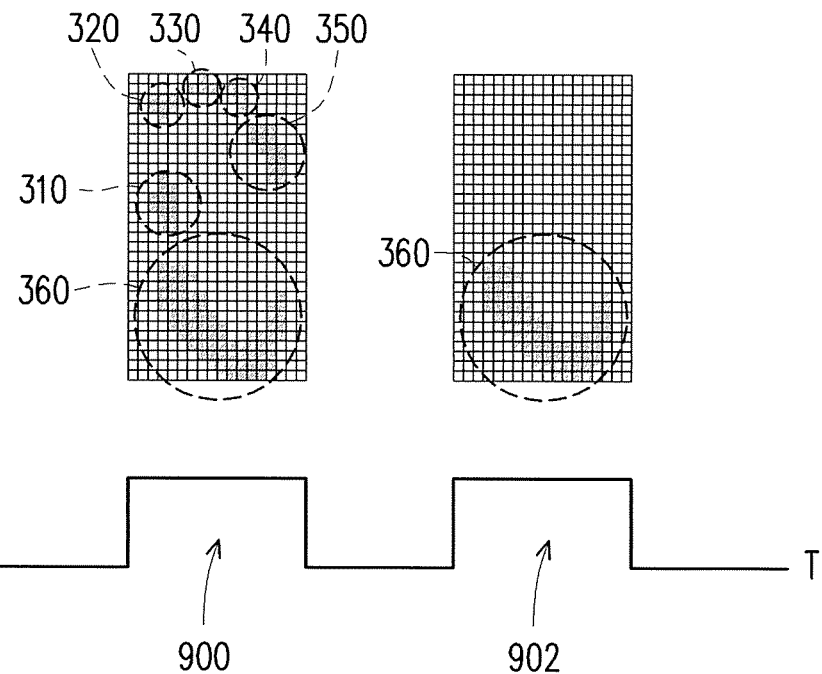
FIG. 12 is a schematic diagram showing a sensed value frame in the usage scenario with relation to two operation periods, according to an embodiment.

When one or more finger positions (such as, the thumb position 310, the forefinger position 320, the middle finger position 330, the ring finger position 340 and/or the little finger position 350) detected in a first period 900 in FIG. 12 are not detected from the sensed value frame in a second period 902, the system circuit 110 determines that the one or more finger positions in the second period are in an "up state". When the system circuit 110 analyzes the sensed value frame and determines that the forefinger position 320 is lifted up and then drops down, the system circuit 110 triggers a "mouse left-click event". When it is determined that the middle finger position 330 is lifted up and then dropped down, the system circuit 110 triggers a "mouse right-click event". When it is determined that the forefinger position 320 and the middle finger position 330 move forward or backward simultaneously, the system circuit 110 triggers an event of "a rolling of the mouse wheel".

Figure 5:
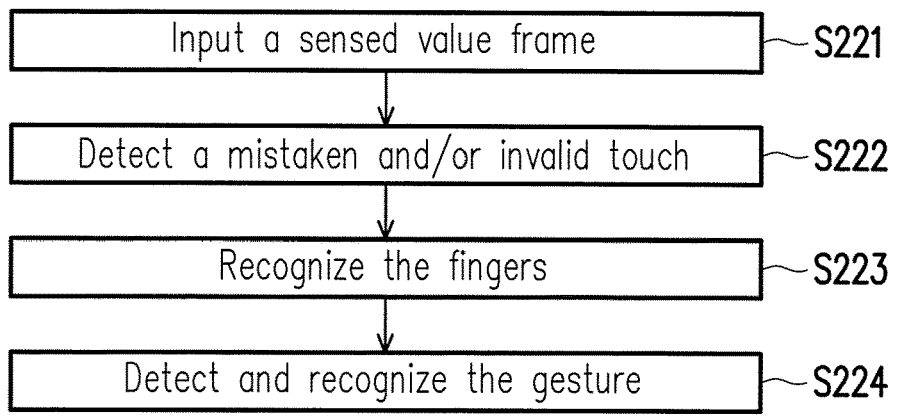
FIG. 5 is a flowchart showing details of step S220 in FIG. 2 in an embodiment.

FIG. 5 is a flowchart showing details of step S220 in FIG. 2 in an embodiment. In the embodiment of FIG. 5, step S220 includes sub-steps S221~S224. In step S221, a sensed value frame 121 is input to the system circuit 110. In step S222, the system circuit 110 analyzes the sensed value frame 121 provided by the driving circuit 120 to detect a mistaken and/or an invalid touch. In an embodiment, except for a sensed value (in an embodiment, the sensed value is a value of the mutual capacitance), the sensed value frame 121 further includes touch point information. In an embodiment, the touch point information includes a coordinate of the touch point, a state of the touch point (such as the up state or the down state), a serial number of the touch point and/or other information. In an embodiment, the touch point information is represented by a touch point sequence {Pi}, wherein Pi=(PIi, PXi, PYi, PSi, PVi, PPi), PIi represents the serial number of the i'th touch point, PXi represents the X coordinate of the i'th touch point, PYi represents the Y coordinate of the i'th touch point, Psi represents the touch control state of the i'th touch point, PVi represents the validity of i'th touch point, PPi represents the palm flag of the i'th touch point. The system circuit 110 records the touch point sequence {CurPi} of the current value frame and the touch point sequence {PrePi} of the previous value frame. The touch control state of the touch point is determined to be the up state or the down state by comparing the sequence {CurPi} with the sequence {PrePi}.

In step S223, the system circuit 110 recognizes the fingers. In an embodiment, the system circuit 110 analyzes the sensed value frame 121 provided by the driving circuit 120 to calculate the touch area. The system circuit 110 finds the sensed position whose touch area is greater than an area threshold value and defines the sensed position as the palm position 360. The palm position 360 is considered as a center position. A vector quantity is calculated from the center position to the finger position (i.e., the thumb position 310, the forefinger position 320, the middle finger position 330, the ring finger position 340 and/or the little finger position 350). A minimum non-rotating rectangle of the palm position 360 is considered as axis bounding box. In an embodiment, the palm flag of the detected position (the palm position 360) is updated to "1". When the palm flag is "1", the palm flag of the same position (the touch point of the same serial number) detected from the next flame remains "1" until the touch point of the serial number changes from the down state to the up state. The palm flag is updated to "0" when the touch point of the serial number changes from the down state to the up state.

After the palm position 360 is detected, the system circuit 110 detects the finger positions (such as, the thumb position 310, the forefinger position 320, the middle finger position 330, the ring finger position 340 and/or the little finger position 350) near the palm position 360 and recognizes each finger. In an embodiment, the system circuit 110 calculates a vector quantity from the palm position 360 (the center position) to the thumb position 310, a vector quantity from the palm position 360 to the forefinger position 320, a vector quantity from the palm position 360 to the middle finger position 330, a vector quantity from the palm position 360 to the ring finger position 340, and a vector quantity from the palm position 360 to the little finger position 350. The vector quantities are converted to corresponding angles. In an embodiment, the angle refers to an angle between the finger vector quantity and the X axis. As for the right hand, the finger vector quantities are sorted according to the angles in a descending order. The sorted finger vector quantites correspond to the thumb finger, the forefinger, the middle finger, the ring finger and the little finger orderly. When the finger vector quantity matches the corresponding finger, the serial number of the touch point, the two dimension coordinate, the angle, the state of the touch point are recorded for each finger simultaneously. In an embodiment, the matched finger vector quantity sequence represents as {Vi}, wherein Vi={VTi, VIi, VXi, VYi, VSi, VAi}, VTi represents the finger corresponding to the i'th finger vector quantity (such as, the thumb finger, the forefinger, the middle finger, the ring finger and the little finger), VIi represents the touch control serial number corresponding to the i'th finger vector quantity, VXi represents the X coordinate of i'th finger vector quantity, VYi represents the Y coordinate of i'th finger vector quantity, VSi represents the touch control state of the i'th finger vector quantity, VAi represents the angle between the i'th finger vector quantity and the axis. The system circuit 110 records the matched finger vector quantity sequence {CurVi} corresponding to the current value frame and the matched finger vector quantity sequence {PreVi} corresponding to the previous value frame. The touch control state of the finger vector quantity is determined to be the up state or the down state by comparing the sequency {CurVi} with the sequency {PreVi}.

In step S224, the system circuit 110 detects and recognizes the gesture according to the matching result. The gesture is variable according to the practical requirement. In an embodiment, when the system circuit 110 analyzes the sensed value frame and determines that the first finger position (such as the forefinger position 320) and the second finger position (such as the middle finger position 330) are in the "up" state, while other finger positions (i.e., the third finger position, such as the thumb position 310, the ring finger position 340 and/or the little finger position 350) are in the "down" state and the third finger position move toward a similar vector, the system circuit 110 triggers a corresponding "cursor movement event" according to the similar vector. In another embodiment, when the first finger position (such as, the forefinger position 320), the second finger position (such as the middle finger position 330) and the third finger position (such as the thumb position 310, the ring finger position 340 and/or the little finger position 350) are in the "down" state, and the first finger position, the second finger position and the third finger position move toward the similar vector together, the system circuit 110 triggers the corresponding "cursor movement event".

In an embodiment, when the system circuit 110 analyzes the sensed value frame and determines that the first finger position (such as the forefinger position 320) and the third finger position are in the "down" state, and the second finger position (such as the middle finger position 330) changes from the "down" state (DOWN1) to the "up" state (UP1) and further back to the "down" state (DOWN2) (the time interval between DOWN2 and UP1 is less than a time threshold), the system circuit 110 triggers a "mouse right-click event". When the system circuit 110 analyzes the sensed value frame and determines that the second finger position (such as the middle finger position 330) and the third finger position are in the "down" state, and the first finger position (such as the forefinger position 320) changes from the "down" state (DOWN1) to the "up" state (UP1) and further back to the "down" state (DOWN2) (the time interval between DOWN2 and UP1 is less than the time threshold), the system circuit 110 triggers a of "mouse left-click event". When the system circuit 110 analyzes the sensed value frame and determines that the second finger position (such as the middle finger position 330) and the third finger position are in the "down" state, and the first finger position (such as the forefinger position 320) changes from the "down" state (DOWN1), the "up" state (UP1), the "down" state (DOWN2), the "up" state (UP2) and to the "down" state (DOWN3) in sequence (the time interval between DOWN2 and UP1 and the time interval between UP2 and DOWN3 are less than the time threshold), the system circuit 110 triggers an event of "a left double-click of the mouse".

In an embodiment, when the system circuit 110 analyzes the sensed value frame and determines that the first finger position (such as the forefinger position 320) and the third finger position remain in the "down" state, and the second finger position (such as the middle finger position 330) changes from the "down" state (DOWN1), the "up" state (UP1), the "down" state (DOWN2) and to the "up" state (UP2) in sequence (the time interval between DOWN2 and UP1 is less than the time threshold), the system circuit 110 triggers the "mouse right-click event". When the system circuit 110 analyzes the sensed value frame and determines that the second finger position (such as the middle finger position 330) and the third finger position remain in the "down" state, and the first finger position (such as the forefinger position 320) changes from the "down" state (DOWN1), the "up" state (UP1), the "down" state (DOWN2) and to the "up" state (UP2) in sequence (the time interval between DOWN2 and UP1 is less than the time threshold), the system circuit 110 triggers the "mouse left-click event".

When the system circuit 110 analyzes the sensed value frame and determines that the second finger position (such as the middle finger position 330) and the third finger position remain in the "down" state, and the first finger position (such as the forefinger position 320) changes from the "down" state (DOWN1), the "up" state (UP1), the "down" state (DOWN2), the "up" state (UP2), the "down" state (DOWN3) and to the "up" state (UP3) in sequence (the time interval between DOWN2 and UP1 and the time interval between UP2 and DOWN3 are less than the time threshold), the system circuit 110 triggers the event of the "left double-click of the mouse".

When the system circuit 110 analyzes the sensed value frame and determines that the second finger position (such as the middle finger position 330) and the third finger position remains in the "down" state, and the first finger position (such as the forefinger position 320) changes from the "down" state to the "up" state and further back to the "down" state, and the first finger position, the second finger position and the third finger position move toward similar vector together, the system circuit 110 triggers a "drag event" according to the similar vector.

Figure 6:
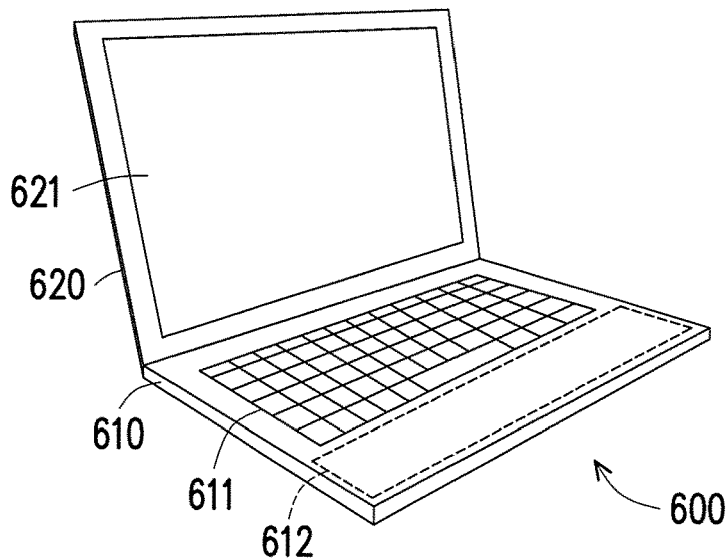
FIG. 6 is a schematic diagram showing a touch control device in an embodiment.
Figure 7:
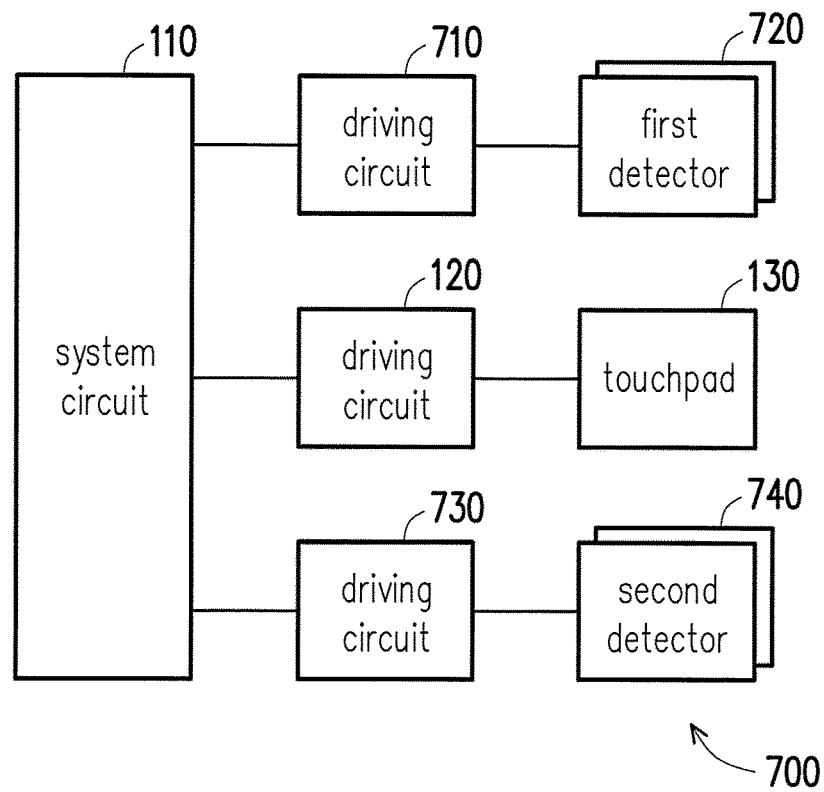
FIG. 7 is a block diagram of a touch control device in an embodiment.

FIG. 6 is a schematic diagram showing a touch control device in an embodiment. In the embodiment, a notebook computer 600 as shown in FIG. 6 is the touch control device 100 in FIG. 1. In another embodiment, the notebook computer 600 as shown in FIG. 6 is a touch control device 700 as shown in FIG. 7 (which is described in detail hereinafter). The notebook computer 600 includes a body 610 and a body 620. The body 620 is pivotably disposed at one side of the body 610. A display panel 621 is configured at the body 620. The system circuit 110, the driving circuit 120, the touchpad 130 and the keyboard 611 are configured at the body 610, and the touchpad 130 is configured at the touchpad area 612 of the body 610.

FIG. 7 is a block diagram of a touch control device in an embodiment. A touch control device 700 includes the system circuit 110, the driving circuit 120, the touchpad 130, a driving circuit 710, a first detector 720, a driving circuit 730 and a second detector 740. Details for the system circuit 110, the driving circuit 120 and the touchpad 130 shown in FIG. 7 can be referred to the system circuit 110, the driving circuit 120 and the touchpad 130 in FIG. 1 and the related descriptions for FIG. 2 to FIG. 5, which is omitted herein. The number of the first detector 720 and the second detector 740 is configurable according to the practical requirement. In an embodiment, the first detector 720 and the second detector 740 are self-capacitance touch control detectors, mutual capacitance touch control detectors or touch control sensing devices of other types. In an embodiment, the first detector 720 and/or the second detector 740 are non-contact sensing devices, such as proximity sensors and self-capacitance touch control detectors.

Figure 8:
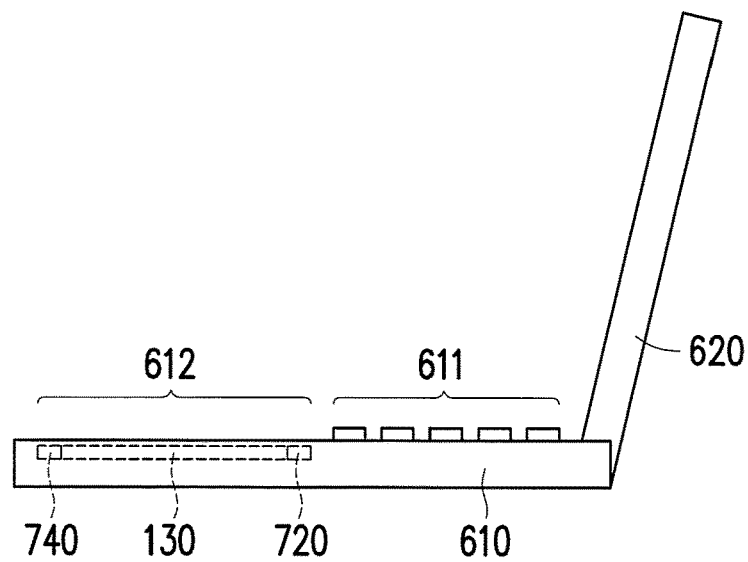
FIG. 8 is a side view of the notebook computer in FIG. 6 in an embodiment.
Figure 9:
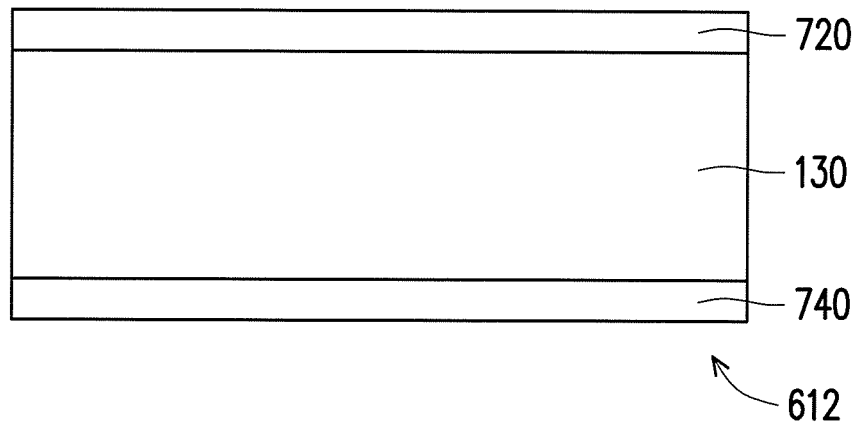
FIG. 9 is a top view of a touchpad area in FIG. 8 in an embodiment.

FIG. 8 is a side view of the notebook computer in FIG. 6 in an embodiment. Referring to FIG. 7 and FIG. 8, the first detector 720 is configured at a first side of the touchpad 130 and the second detector 740 is configured at a second side of the touchpad 130. FIG. 9 is a top view of the touchpad area in FIG. 8 in an embodiment. The first detector 720 and the second detector 740 are detectors of strip type and disposed at opposite sides of the touchpad 130, respectively.

As showed in FIG. 7, the driving circuit 710 is coupled to the first detector 720 and the system circuit 110. The driving circuit 710 drives the first detector 720 to detect a touch event on the first detector 720. When the system circuit 110 detects the touch event on the first detector 720 via the driving circuit 710, the system circuit 110 ignores the touch event on the touchpad 130 to prevent a mistaken touch. The driving circuit 730 is coupled to the second detector 740 and the system circuit 110. The driving circuit 730 drives the second detector 740 to detect a touch event on the second detector 740. When the system circuit 110 detects the touch event on the second detector 740 via the driving circuit 730, the system circuit 110 considers the position of the second detector 740 as a palm position (for example, regarding as the palm position 360 in FIG. 4 or a palm position replacing the palm position 360 in FIG. 4) of a gesture for operating the mouse.

Figure 10:
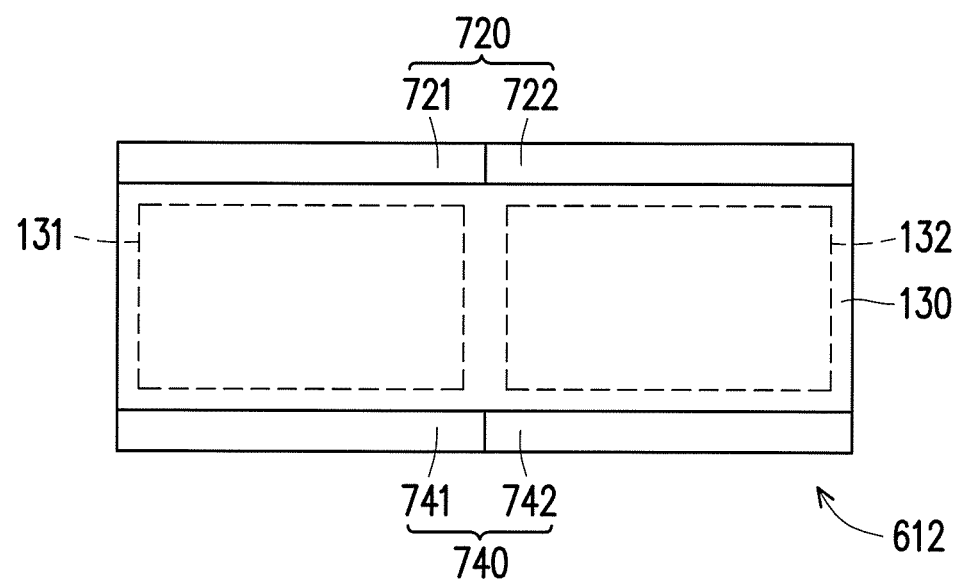
FIG. 10 is a top view of the touchpad area in FIG. 8 in an embodiment.

FIG. 10 is a top view of the touchpad area in FIG. 8 in an embodiment. The first detector 720 includes two detectors 721 and 722. The second detector 740 includes two detectors 741 and 742. In an embodiment, the detectors 721, 722, 741 and 742 are detectors of strip type. In an embodiment, the detectors 721, 722, 741 and 742 are self-capacitance/mutual capacitance touch control detectors. In an embodiment, the detectors 721, 722, 741 and 742 are non-contact sensing devices, such as proximity sensors and self-capacitance touch control detectors. The detectors 721 and 722 are configured at a side of the touchpad 130, and the detectors 741 and 742 are configured at an opposite side of the touchpad 130, as shown in FIG. 10. When the system circuit 110 detects a touch event on the first detector 720 via the driving circuit 710, the system circuit 110 ignores (does not process) a touch event on the corresponding area of the touchpad 130 of the first detector 720. In an embodiment, when the system circuit 110 detects a touch event on the detector 721 via the driving circuit 710, the system circuit 110 ignores (does not process) a touch event on the corresponding area 131 of the touchpad 130 corresponding to the detector 721. When the user operates the keyboard 611 by the left hand and operates the touchpad 130 by the right hand simultaneously, the left wrist contacting the touchpad 130 would not mistakenly trigger a mouse event by the touch event on the corresponding area 131 of the touchpad 130. Similarly, when the system circuit 110 detects a touch event on the detector 722 via the driving circuit 710, the system circuit 110 ignores (does not process) a touch event on the corresponding area 132 of the touchpad 130.

When the system circuit 110 detects a touch event on the second detector 740 via the driving circuit 730, the system circuit 110 considers the position of the second detector 740 as a palm position (for example, regarding as the palm position 360 shown in FIG. 4 or a palm position replacing the palm position 360 shown in FIG. 4) of a gesture for operating the mouse. In an embodiment, when the system circuit 110 detects a touch event on the detector 741 via the driving circuit 730, the system circuit 110 considers the position of the detector 741 as the palm position (for example, regarding as the palm position 360 shown in FIG. 4 or a palm position replacing the palm position 360 shown in FIG. 4) of a gesture for operating the mouse. Similarly, when the system circuit 110 detects a touch event on the detector 742 via the driving circuit 730, the system circuit 110 considers the position of the detector 742 as the palm position of the gesture for operating the mouse.

Figure 11:
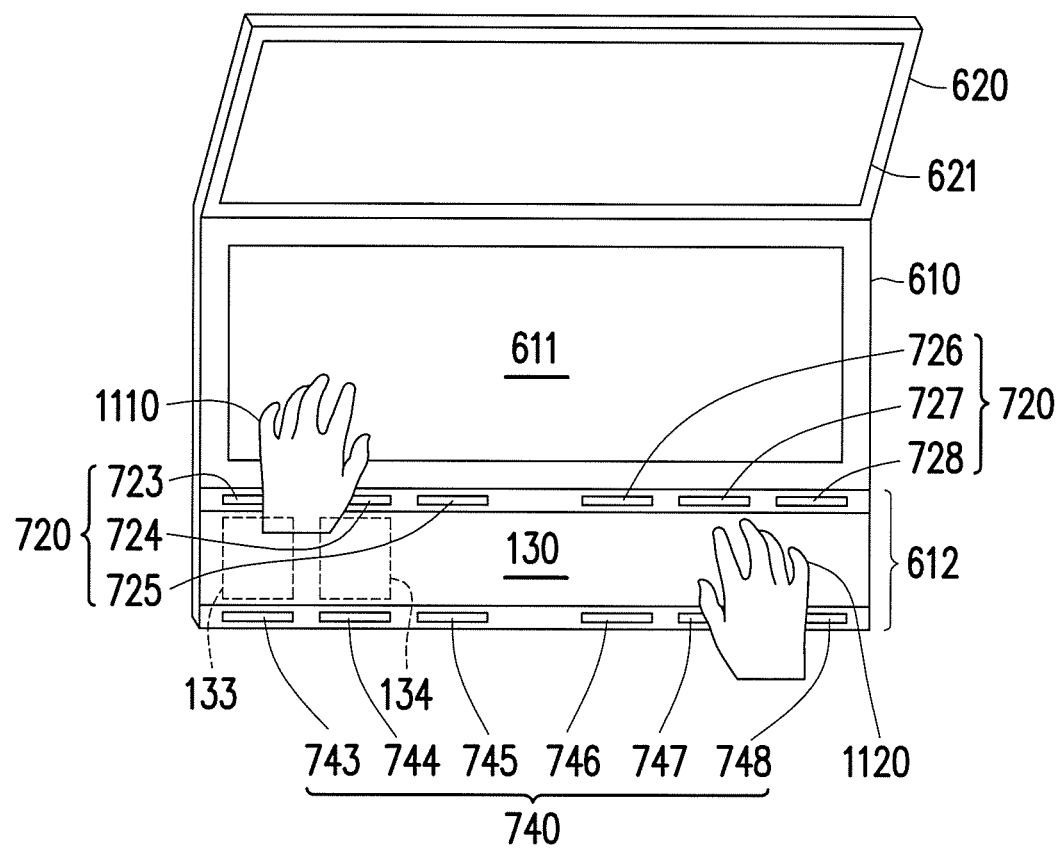
FIG. 11 is a top view of the touchpad area in FIG. 8 in an embodiment.

FIG. 11 is a top view of the touchpad area 612 in FIG. 8 in an embodiment. The first detector 720 includes six detectors 723, 724, 725, 726, 727 and 728, and the second detector 740 includes six detectors 743, 744, 745, 746, 747 and 748. The detectors 723~728 and 743~748 are detectors of strip type. The detectors 723~728 and 743~748 are self-capacitance touch control detectors, mutual capacitance touch control detectors or touch control sensing devices of other type. In an embodiment, the detector 723~728 and 743~748 are non-contact sensing devices, such as proximity sensors, self-capacitance touch control detectors. The detectors 723~728 are configured at a side of the touchpad 130, and the detectors 743~748 are configured at an opposite side of the touchpad 130, as shown in FIG. 11. When the system circuit 110 detects a touch event on the detectors 723~728 via the driving circuit 710, the system circuit 110 ignores (does not process) a touch event on the corresponding area of the touchpad 130 corresponding to the detector 723~728. In an embodiment, when the user operates the keyboard 611 by the left hand 1110 and operates the touchpad 130 by the right hand 1120 simultaneously, the detectors 723 and 724 detect the left hand 1110 and ignore a touch event on the corresponding areas 133 and 134 of the touchpad 130. Therefore, even when the left wrist contacts the touchpad, the touchpad 130 would not mistakenly trigger a mouse event with the touch event on the corresponding areas 133 and 134 of the touchpad 130.

When the system circuit 110 detects a touch event on the detectors 743~748 via the driving circuit 730, the system circuit 110 considers the position of the detectors 743~748 as a palm position of a gesture for operating the mouse. In an embodiment, when the system circuit 110 detects a touch event on the detector 747 via the driving circuit 730, the system circuit 110 considers the position of the detector 747 as the palm position of the gesture for operating the mouse (for example, regarding as the palm position 360 shown in FIG. 4 or a palm position replacing the palm position 360 shown in FIG. 4).

In different usage scenarios, the system circuit 110 is software, firmware or hardware to implement related functions via programming languages (such as C or C++ language), hardware description languages (such as Verilog HDL or VHDL language), or other suitable languages. Any software (or firmware) implementing the related functions can be stored in a computer-accessible medium, such as a magnetic tape, a semiconductor memory, a magnetic disk or a compact disk (such as a CD-ROM or a DVD-ROM). In an embodiment, the software (or firmware) implementing the related functions is transmitted via the Internet, wired communication, wireless communication or other communication mediums. The software (or firmware) is stored in the computer-accessible medium, so that the processor of the computer easily accesses/implements the programming codes of the software (or firmware). In an embodiment, the device and the method are provided via the combination of the hardware and the software.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A touch control device comprising:
   a touchpad;
   a first driving circuit coupled to the touchpad, configured to drive the touchpad to detect a sensed value frame of a touch event on the touchpad; and
   a system circuit coupled to the first driving circuit, configured to analyze the sensed value frame provided by the first driving circuit to recognize a first finger position, a second finger position and a third finger position, and to define the first finger position as a left key position of a virtual mouse, the second finger position as a right key position of the virtual mouse according to a position relationship among the first finger position, the second finger position and the third finger position,
   wherein as the left key position and the right key position having been detected to move forward or backward simultaneously, the system circuit triggers a rolling of a mouse wheel of the virtual mouse.

2. The touch control device according to claim 1, wherein the system circuit recognizes a palm position from the sensed value frame and defines the palm position as the position of the virtual mouse; when the system circuit analyzes the sensed value frame and determines that the palm position and the finger positions from the sensed value frame move together toward a similar vector, the system circuit triggers a cursor movement event.

3. The touch control device according to claim 1, when the recognized first finger position and second finger position in a first period do not have the sensed value frame in a second period, the system circuit determines that the first finger position and the second finger position are in an up state in the second period; when the system circuit analyzes the sensed value frame and determines that the first finger position and the second finger position are in the up state, the third finger position remains in a down state
   and the third finger position moves toward a similar vector, the system circuit triggers a cursor movement event.

4. The touch control device according to claim 1, when the recognized second finger position in a first period does not have the sensed value frame in a second period, the system circuit determines that the second finger position is in an up state in the second period; when the system circuit analyzes the sensed value frame and determines that the first finger position and the third finger position are in a down state, and the second finger position changes from the down state to an up state and further back to the down state, or from the down state, an up state, the down state, and to the up state in sequence, the system circuit triggers a mouse right-click event.

5. The touch control device according to claim 1, when the recognized first finger position in a first period does not have the sensed value frame in a second period, the system circuit determines that the first finger position in the second period is in an up state; when the system circuit analyzes the sensed value frame and determines that the second finger position and the third finger position are in a down state, and the first finger position changes from the down state to the up state and further back to the down state, or from the down state, the up state, the down state and to the up state in sequence, the system circuit triggers a mouse left-click event.

6. The touch control device according to claim 1, the recognized first finger position in a first period does not have the sensed value frame in a second period, the system circuit determines that the first finger position is in an up state in the second period; when the system circuit analyzes the sensed value frame and determines that the second finger position and the third finger position are in a down state, and the first finger position changes from the down state, the up state, the down state, the up state and to the down state in sequence, or from the down state, the up state, the down state, the up state, the down state and to the up state, the system circuit triggers a mouse left double click event.

7. The touch control device according to claim 1, when the recognized first finger position in a first period does not have the sensed value frame in a second period, the system circuit determines the first finger position in the second period is in an up state; when the system circuit analyzes the sensed value frame and determines that the second finger position and the third finger position are in a down state, and the first finger position changes from the down state to the up state and further back to the down state, and the first finger position, the second finger position and the third finger position move toward a similar vector together, the system circuit triggers a drag event.

8. The touch control device according to claim 1, further comprising:
   a first detector disposed at a first side of the touchpad; and
   a second driving circuit coupled to the first detector and the system circuit, configured to drive the first detector to detect a touch event on the first detector;
   wherein when the system circuit detects the touch event on the first detector via the second driving circuit, the system circuit ignores a touch event on a corresponding area of the touchpad corresponding to the first detector.

9. The touch control device according to claim 8, further comprising:
   a second detector disposed at a second side of the touchpad; and
   a third driving circuit coupled to the second detector and the system circuit, configured to drive the second detector to detect a touch event of the second detector;
   wherein when the system circuit detects the touch event on the second detector via the third driving circuit, the system circuit considers the position of the second detector as a palm position.

10. An operating method of a touch control device comprising:
    providing a touchpad;
    driving the touchpad by a first driving circuit to detect a sensed value frame of a touch event on the touchpad;
    analyzing the sensed value frame by a system circuit to recognize a first finger position, a second finger position and a third finger position;
    defining the first finger position as a left key position of a virtual mouse and defining the second finger position as a right key position of the virtual mouse by the system circuit according to a position relationship among the first finger position, the second finger position and the third finger position; and
    triggers a rolling of a mouse wheel of the virtual mouse by the system circuit as the left key position and the right key position having been detected to move forward or backward simultaneously.

11. The operating method of the touch control device according to claim 10, wherein the system circuit recognizes a palm position from the sensed value frame and defines the palm position as the position of the virtual mouse, the operating method further comprises:
    triggering a cursor movement event by the system circuit when the system circuit analyzes the sensed value frame and determines that the palm position and the finger position from the sensed value frame move toward a similar vector together.

12. The operating method of the touch control device according to claim 10, wherein when the recognized first finger position and the second finger position in a first period does not have the sensed value frame in a second period, the system circuit determines that the first finger position and the second finger position in the second period are in an up state, the operating method further comprises:
    triggering a cursor movement event by the system circuit when the system circuit analyzes the sensed value frame and determines that the first finger position and the second finger position are in the up state, the third finger position is in a down state, and the third finger position move toward the similar vector.

13. The operating method of the touch control device according to claim 10, wherein when the recognized second finger position in a first period does not have the sensed value frame in a second period, the system circuit determines that the second finger position in the second period is in an up state, the operating method further comprises:
    triggering a mouse right-click event by the system circuit when the system circuit analyzes the sensed value frame and determines that the first finger position and the third finger position are in a down state, and the second finger position changes from the down state to the up state and further back to the down state or the second finger position changes from the down state, the up state, the down state and to the up state in sequence.

14. The operating method of the touch control device according to claim 10, wherein when the recognized first finger position in a first period does not have the sensed value frame in a second period, the system circuit determines that the first finger position in the second period is in an up state, and the operating method further comprises:
    triggering a mouse left-click event by the system circuit when the system circuit analyzes the sensed value frame and determines that the second finger position and the third finger position are in a down state, and the first finger position changes from the down state to the up state and further back to the down state.

15. The operating method of the touch control device according to claim 10, wherein when the recognized first finger position in a first period does not have the sensed value frame in a second period, the system circuit determines that the first finger position in the second period is in an up state, the operating method further comprises:
    triggering a mouse left-click event by the system circuit when the system circuit analyzes the sensed value frame and determines that the second finger position and the third finger position are in a down state, and the first finger position changes from the down state, the up state, the down state and to the up state in sequence.

16. The operating method of the touch control device according to claim 10, wherein when the recognized first finger position in a first period does not have the sensed value frame in a second period, the system circuit determines that the first finger position in the second period is in an up state, the operating method further comprises:
    triggering an event of a left double click of the mouse by the system circuit when the system circuit analyzes the sensed value frame and determines that the second finger position and the third finger position are in a down state, and the first finger position changes from the down state, the up state, the down state, the up state and to the down state in sequence.

17. The operating method of the touch control device according to claim 10, wherein when the recognized first finger position in a first period does not have the sensed value frame in a second period, the system circuit determines that the first finger position in the second period is in an up state, the operating method further comprises:
   triggering an event of a left double click of the mouse by the system circuit when the system circuit analyzes the sensed value frame and determines that the second finger position and the third finger position are in a down state, and the first finger position changes from the down state, the up state, the down state, the up state, the down state and to the up state in sequence.

18. The operating method of the touch control device according to claim 10, wherein when the recognized first finger position in a first period does not have the sensed value frame in a second period, the system circuit determines that the first finger position in the second period is in an up state, the operating method further comprises:
   triggering a drag event according to a similar vector by the system circuit when the system circuit analyzes the sensed value frame and determines the second finger position and the third finger position are in a down state, and the first finger position changes from the down state to the up state and further back to the down state, and the first finger position, the second finger position and the third finger position move together toward the similar vector.

19. The operating method of the touch control device according to claim 10, further comprising:
   disposing a first detector at a first side of the touchpad;
   driving the first detector by a second driving circuit to detect a touch event on the first detector; and
   ignoring a touch event on a corresponding area of the touchpad corresponding to the first detector when the touch event on the first detector is detected.

20. The operating method of the touch control device according to claim 19, further comprising:
   disposing a second detector at a second side of the touchpad;
   driving a second detector by a third driving circuit to detect a touch event on the second detector; and
   considering the position of the second detector as a palm position when the touch event is detected on the second detector.

\* \* \* \* \*